Patented Jan. 24, 1928.

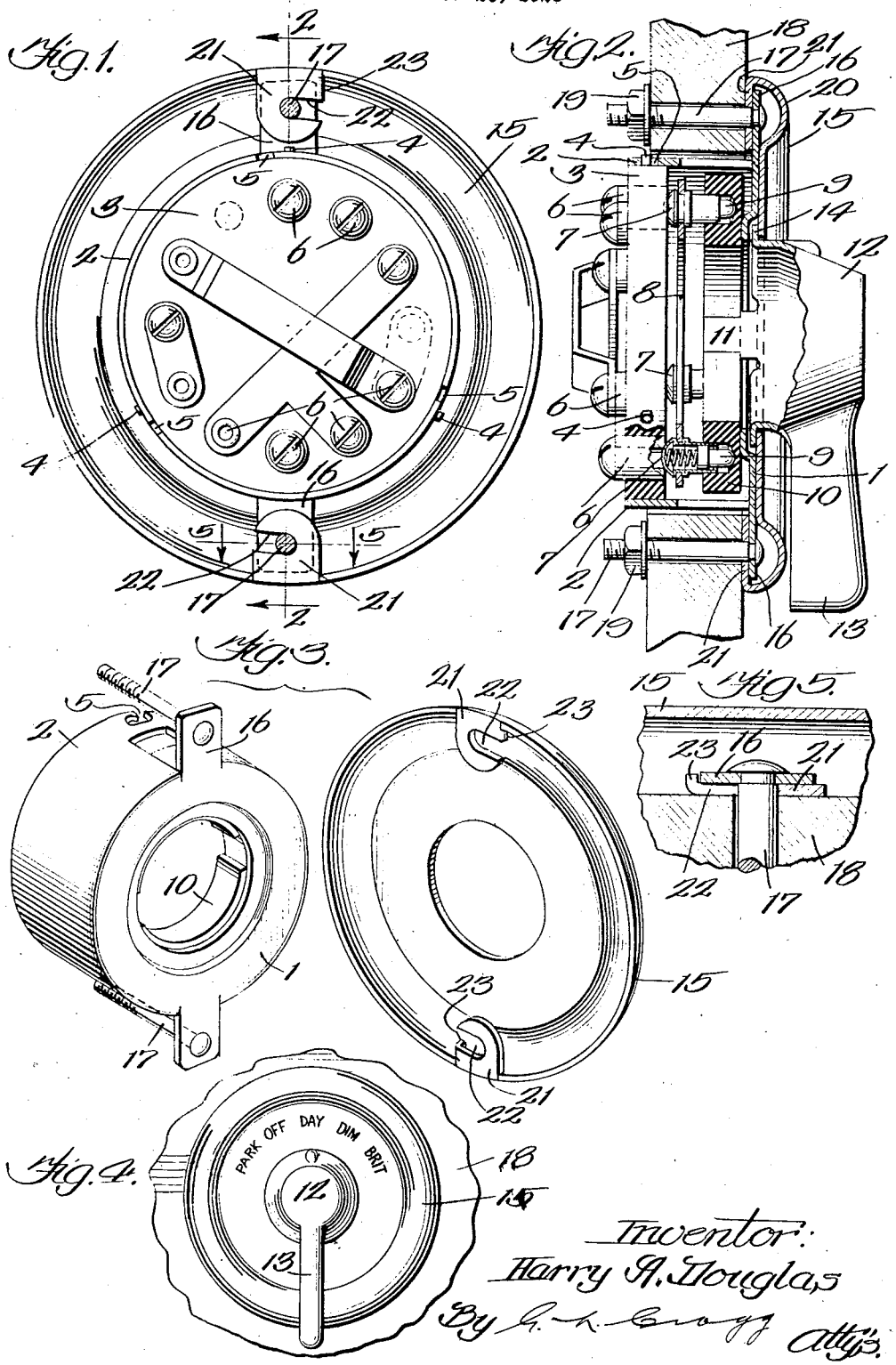

1,657,005

UNITED STATES PATENT OFFICE.

HARRY A. DOUGLAS, OF BRONSON, MICHIGAN.

INSTRUMENT CASING.

Application filed October 26, 1925. Serial No. 64,898.

My invention relates to instrument casings and is of particular utility in conjunction with the casings that are employed for housing automobile switches.

The invention has for its object the concealment of the places of attachment of the casings with their mountings and for assembling finishing cover plates with the casings.

The structure of my invention comprises a casing provided with portions for attaching the same to a mounting and a cover plate provided with holding formations between which and the body of the cover plate, said casing attaching portions are disposed.

In the preferred embodiment of the invention, the casing is formed with laterally projecting mounting wings at the front end, and mounting rods assembled with said wings, the cover plate overlying said wings and having oppositely directed hook formations between which and the body of the cover plate, the mounting wings are received and which hook formations receive the mounting rods.

The structure of my invention is also inclusive of a ring overlying the wing portion of the casing and having formations, preferably the aforesaid hook formations, but to which formations the invention is not to be limited, that are interposed between the wing portion of the casing and the mounting for the casing.

The invention will be more fully explained in connection with the accompanying drawing in which Fig. 1 is a rear view showing my invention as employed in connection with automobile switching mechanism; Fig. 2 is a sectional view on line 2—2 of Fig. 1; Fig. 3 is a perspective view of the casing and its finishing cover plate separated therefrom; Fig. 4 is a front view of the structure on a smaller scale; and Fig. 5 is a sectional view on line 5—5 of Fig. 1.

The switching mechanism illustrated will be generally described inasmuch as a part thereof constitutes a closure for the rear end of the casing.

The switch casing has an end wall 1 and a side wall 2, the wall 1 being essentially flat and the wall 2 being cylindrical. The rear end of the switch casing is closed by a contact carrier 3 which is separably assembled with the casing by means of bayonet pins 4 upon the contact carrier receivable in bayonet slots 5 provided in the casing wall 2. The contact carrier carries contacts 6 engageable by contacts 7 that are carried upon a metallic ring 8 and which are coupled by means of the spring-pressed plungers 9 with a contact actuator 10. This contact actuator is assembled with the wings 11 extending inwardly from the hub portion 12 of a handle 13. The handle hub is provided with a flange 14 received between the end wall 1 of the casing and the finishing cover plate 15, whereby the handle is confined to an axis of rotation which is coincident with the casing axis.

The casing wall 1 is formed with laterally projecting mounting wings 16 with which the front ends of the mounting rods 17 are preferably permanently assembled. These mounting rods pass through the mounting board 18 and are held in assembly therewith by means of nuts 19 screwed upon the rods. The cover plate conceals the end wall 1 of the casing and overlies the wings 16, this cover plate being desirably beaded into a ring as indicated at 20 where the front ends of the rods 17 are disposed. The cover plate is provided with holding hook formations 21 extending inwardly from the edge of the cover plate to be covered by the plate and whose hook spaces 22 are oppositely directed. The hook formations are interposed between the wings 16 and the mounting board 18 and receive the mounting rods 17, the mounting wings being disposed between said hook formations and the body portion of the cover plate. Detaining lugs 23 are provided upon the hook formations at the entrance ends of the openings 22, these lugs extending into the plane of the wings and engaging the wings to hold them and their mounting rods in assembly with the hook formations.

Changes may be made without departing from my invention.

Having thus described my invention, I claim:

1. The combination with a casing formed with laterally projecting wings at one end; mounting rods assembled with said wings; a cover plate overlying said wings and having oppositely directed hook formations receiving said rods and between which and the body of the cover plate said wings are received; and detaining lugs provided upon the hook formations at the entrances thereof and projecting into the plane of the wings and engaging the wings.

2. The combination with a casing formed with laterally projecting wings at one end; mounting rods assembled with said wings; and a cover plate overlying said wings and having oppositely directed hook formations extending inwardly from the edge of the cover plate to be covered by the plate and receiving said rods and between which and the body of the cover plate said wings are received to be also covered by said plate.

3. The combination with a casing formed with laterally projecting wings at one end; mounting rods assembled with said wings; and a cover plate overlying said wings and having holding formations extending inwardly from the edge of the cover plate to be covered by the plate and receiving said rods and between which and the body of the cover plate said wings are received to be also covered by said plate.

4. The combination with a casing formed with a laterally projecting wing; of a ring coaxial with the casing and covering said wing; and a mounting surrounding the casing, said ring having an inwardly extending formation interposed between said ring and mounting to retain the ring in position.

In witness whereof, I hereunto subscribe my name.

HARRY A. DOUGLAS.